United States Patent [19]

Zemlicka et al.

[11] Patent Number: 4,905,956

[45] Date of Patent: Mar. 6, 1990

[54] FLUID MOUNTING SYSTEM FOR A MARINE ENGINE

[75] Inventors: Alvin R. Zemlicka, Elkart Lake; Robert R. Radtke, Oshkosh, both of Wis.

[73] Assignee: Brunswick Corporation, Skokie, Ill.

[21] Appl. No.: 199,137

[22] Filed: May 26, 1988

[51] Int. Cl.$^4$ ............................................. F16M 13/00
[52] U.S. Cl. ................................... 248/562; 248/636; 248/638; 248/659; 267/140.1
[58] Field of Search ............... 248/562, 565, 563, 636, 248/638, 659; 440/111; 267/140.1

[56] References Cited

U.S. PATENT DOCUMENTS

| | | | |
|---|---|---|---|
| 2,059,220 | 11/1936 | Fernstrum | 440/111 |
| 3,245,646 | 4/1966 | Baratoff | 248/632 X |
| 3,259,099 | 7/1966 | Kiekhaefer | . |
| 3,865,068 | 2/1975 | Haasl | . |
| 4,003,330 | 1/1977 | Compton | 440/111 |
| 4,079,882 | 3/1978 | Mizuyoshi | 248/638 X |
| 4,432,537 | 2/1984 | Pletsch | 248/562 X |
| 4,573,656 | 3/1986 | Yoshida | 248/562 |
| 4,657,219 | 4/1987 | Kakimoto | 267/140.1 X |
| 4,657,227 | 4/1987 | Hofmann | 267/140.1 X |
| 4,657,232 | 4/1987 | West | 267/140.1 |
| 4,717,130 | 1/1988 | Barkhage | . |

FOREIGN PATENT DOCUMENTS

| | | | |
|---|---|---|---|
| 0258851 | 9/1986 | European Pat. Off. | 248/562 |
| 2041488 | 9/1980 | United Kingdom | 267/140.1 |

OTHER PUBLICATIONS

"A New Generation of Engine Mounts", by Marc Bernuchon, SAE International Congress & Exposition, Detroit, Michigan, Feb. 27–Mar. 2, 1984.

Primary Examiner—J. Franklin Foss
Attorney, Agent, or Firm—Andrus, Sceales, Starke & Sawall

[57] ABSTRACT

A fluid mount for an inboard marine engine includes a combination of a solid elastomer and a fluid dampening means to significantly improve vibration isolation and cushioning under normal shock loads. The fluid dampening means is constructed to lock-up and become inoperative under heavy shock loads to protect the mount against overload failure. An improved mounting system utilizing the fluid mounts optimizes the performance thereof.

18 Claims, 2 Drawing Sheets

FLUID MOUNTING SYSTEM FOR A MARINE ENGINE

BACKGROUND OF THE INVENTION

The present invention relates to a system for mounting an inboard marine engine to the hull of a boat and to a fluid mount construction for use in such a mounting system.

Resilient vibration and shock absorbing mounts have long been used between inboard marine engines and the boat hulls to which they are attached. Such engine mounting arrangements have included systems in which each of several separate mounts includes a flexible solid elastomer element, or a combination of elastomer and rigid or semi-rigid mounts.

U.S. Pat. No. 3,259,099 discloses a three point mounting system for an inboard marine engine in which each of the mounts includes a hollow cylindrical elastomer member mounted between cylindrical inner and outer metal sleeves. One of the sleeves is attached to the engine and the other to the boat hull or an intermediate supporting structure. Thus, solid elastomer elements help isolate the transmission of vibration from the engine to the boat hull and to cushion the impact of shock loads occurring, for example, by the boat travelling over rough water. In the particular mounting arrangement shown, one resilient mount is located centrally in front of the engine and the other two are spaced laterally on either side of the engine at the rear thereof.

In U.S. Pat. No. 3,865,068 another type of three point mounting system is disclosed in which a pair of lateral rigid mounting members are located approximately mid-engine on either side thereof and the rear of the engine is attached to the boat transom by a radially expandable elastomeric element between the engine drive shaft housing and a mounting hole through the transom.

U.S. Pat. No. 4,717,130 describes a shock and vibration dampening suspension system for mounting an inboard marine engine and its attached outboard drive unit to a boat. Pairs of forward and rear solid elastomer mounts are utilized with each pair comprising a varying construction to accommodate lifting forces at the front of the engine and opposite downwardly acting forces at the rear. The solid elastomer members are of a block-like construction and are bonded to rigid upper and lower connecting members attached to the engine and the engine bed on the boat hull.

Solid elastomer mounts of other shapes, sizes and locations have been used to support inboard marine engines on the boat hull and to dampen the transmission of vibrations from the former to the latter. The elastomer mounts also serve to cushion to some extent light shock loadings, such as are encountered in normal operation.

As with any engine, the frequency of vibrations transmitted by the engine to the boat (and of course experienced by the passengers) varies substantially from idle or low speed to cruising and high speed operation. Ideally, optimum isolation of vibratory forces would require varying stiffnesses of elastomer elements for varying vibration frequencies. This is, of course, impractical or impossible and, therefore, marine engine mounts have typically utilized an elastomer material which represents a compromise in stiffness and optimum vibration dampening effectiveness. Similarly, the capability of the elastomer to absorb or cushion light or low shock loads is compromised as well.

For use in the automotive industry, a fluid mount has been developed which utilizes the combined damping and isolation features of a solid elastomer and a hydraulic cushioning device. In such a fluid mount, a solid annular elastomer element is disposed between and bonded to two rigid connector members. One of the connector members is attached to the engine and the other to the supporting frame of the vehicle. In addition, one of the connector members, along with the elastomer element, forms a housing for a fluid dampening means which includes a chamber filled with a liquid, a flexible diaphragm forming one wall of the chamber adjacent the connector member, and an inertia track within the chamber between the elastomer element and the diaphragm and separating the liquid within the chamber. The inertia track has an aperture or orifice therein which permits the flow of liquid through the aperture from one side of the inertia track to the other in response to movement of the elastomer element under load. Substantial additional dampening of vibration and cushioning of light shock loads is provided by the fluid cushion in conjunction with the solid elastomer.

However, attempts to apply automotive fluid mount technology directly to marine applications were unsuccessful. Automotive fluid mounts were selected for the two lateral front mounts on an inboard marine engine based on automotive criteria related to engine size, mount loading, and mount location. This included providing an inertia track within the fluid chamber with an aperture sized for automotive application. There was found to be no improvement in vibration isolation nor was there an improvement in the dampening of low shock loads as a result of normal wave action. More significantly, however, automotive fluid mounts operated totally unsatisfactorily under high shock loads, as might typically be imposed as a result of heavy wave action where the boat drops vertically from the crest to the trough of a large wave.

Under such circumstances of operation the load imposed on a marine mounting system is often as high as 20 g's and peak loads as high as 40 g's have been encountered with larger engines. Under these conditions, conventional automotive fluid mounts bottom out and quickly fail. By comparison, the fluid mounts in an automotive application experience loads of only 5 to 6 g's in normal operation. When these mounts are used in a marine application under high shock load conditions, they bottom out and quickly fail, either through failure of the elastomer or the casting comprising one of the rigid connecting members.

SUMMARY OF THE INVENTION

In accordance with the present invention, significant modifications to conventional automotive fluid mounts as well as their location with respect to the engine have resulted in a marine fluid mount and mounting system which provide a substantially improved ride and a mount which is able to withstand high shock loads without failure of the mount or damage to the boat hull.

In the improved fluid mount, the aperture in the inertia track has been reduced significantly in size, such that its cross sectional area is more than 5 times smaller than the area of the aperture suggested by utilizing conventional automotive design criteria. The resulting marine fluid mount has substantially increased stiffness resulting in significantly improved ride quality. Moreover, the movement of the liquid in the damping chamber past the inertia track under high shock loads is essentially prevented. As a result, the mounts are prevented from bottoming out and rapid failure is precluded.

In addition, to assist in withstanding the high impact shock loads encountered in marine use, the metal casting utilized for the rigid connecting members comprises a more ductile metal. Novel containment means are also utilized to hold the mount components together should a failure occur.

The system for mounting the engine to the boat hull utilizing the fluid mounts of the present invention also represents a substantial departure from conventional automotive design. A pair of improved fluid mounts interconnects the engine and the supporting structure at the forward end of the engine with the fluid mounts disposed in lateral alignment on opposite sides of the engine. The rear of the engine is supported in a conventional manner with solid elastomer mounts. The combination provides optimal vibration isolation and shock load distribution. The fluid mounts are located far forward of the more or less mid-engine center of gravity location suggested by conventional automotive design criteria.

DETAILED DESCRIPTION OF THE PREFERRED EMBODIMENT

Figure 1:
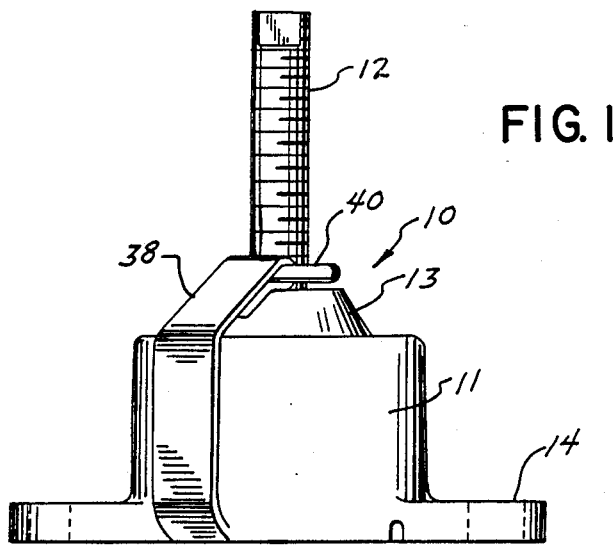
FIG. 1 is a side elevation of a fluid mount of the present invention.
Figure 2:
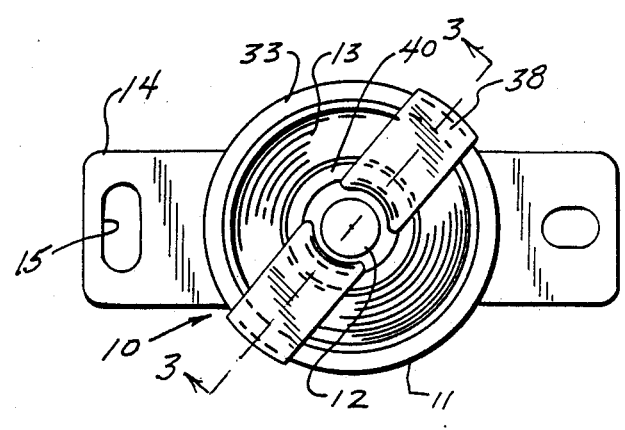
FIG. 2 is a top plan view of the fluid mount shown in FIG. 1.
Figure 3:
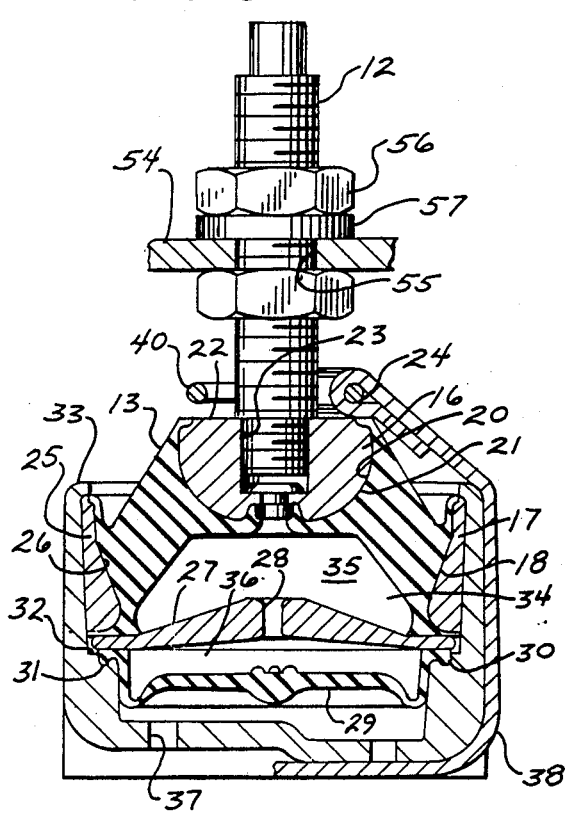
FIG. 3 is a vertical section through the fluid mount taken on line 3—3 of FIG. 2.

Referring particularly to FIGS. 1–3, a fluid mount 10 includes a housing 11 and a mounting stud 12 interconnected by an elastomer member 13. The housing 11 includes a pair of oppositely extending mounting flanges provided with mounting slots 14 for attachment to supporting structure on the hull of the boat, as will be described hereinafter. The mounting stud 12 has a threaded OD for attachment directly to a marine engine, in a manner also to be described.

The interconnection of the elastomer member 13 between the housing 11 and the stud 12 is provided by upper and lower connecting members 16 and 17, respectively. The elastomer member 13 is in the shape of a frustoconical annulus having a lower and radially outer surface 18 bonded to the lower connecting member 17 and an upper generally radially inner surface 20 bonded to the upper connecting member 16. The upper connecting member is of a generally semi-spherical construction, including a flat upper surface 22 having a threaded bore 23 into which the complimentary lower end 24 of the mounting stud 12 is received. The upper inner surface 20 of the elastomer member is bonded to the semi-spherical surface 21 of the upper connecting member 16. The lower connecting member 17 comprises a generally cylindrical annulus 25 having a tapered inner surface 26 which converges in a downward direction and to which the lower outer surface 18 of the elastomer member 13 is bonded. The cylindrical annulus 25 is adapted to fit tightly within the cylindrical interior of the housing 11 and to provide therewith an interior space for the fluid dampening feature to be described.

Within the housing 11 immediately below the lower end of the bonded interface between the elastomer member 13 and the lower connecting member 17, there is disposed an inertia track 27. The inertia track comprises a rigid metal disc having a thin peripheral edge and a thicker center portion, the latter provided with an axially disposed aperture 28. Immediately below the inertia track 27 and above the bottom wall of the housing 11, there is disposed a flexible diaphragm 29. The diaphragm 29 is made of a flexible elastomer material and formed into a shallow cup-like construction.

The various components of fluid mount 10 are assembled serially into the housing 11 to provide a leak-tight construction. A radially outer lip 30 on the diaphragm 29 rests on an annular shoulder 32 in the housing wall and is received in an annular groove 31 therein. The inertia track 27 is placed over and in contact with the lip 30 of the diaphragm 29. The subassembly comprising the interconnected lower member 17, elastomer member 13 and upper member 16 is inserted into the housing 11 over the inertia track 27. The bond between the elastomer and the inner surface 26 of the cylindrical annulus 25 preferably extends around the lower end thereof to provide a flexible seal at the interface with the peripheral edge of the inertia track. The open upper edge 33 of the housing 11 is crimped inwardly over the upper edge of the cylindrical annulus 25 to hold the mount assembly together.

The annular frustoconical shape of the elastomer and the shape and location of the surfaces 21 and 26 of the upper and lower connecting members 16 and 17, respectively, adapt the assembly particularly to absorb loads imposed downwardly on the axis of the mounting stud 12 and resulting in compression of the elastomer and downward deflection of the upper connecting member with respect to the housing 11 and rigidly attached lower member 17. Such action is typical of solid elastomer mounts. The supplemental fluid cushioning and isolation is provided by filling the chamber 34 between the elastomer member 13 and the diaphragm 29 with a liquid. The liquid may be water or, more preferably, a mixture of water and an antifreeze such as ethylene glycol. The chamber 34 is separated into upper and lower subchambers 35 and 36, respectively, by the inertia track 27. As the elastomer and attached upper connecting member deflect downwardly under an axial compressive load imposed on the mounting stud 12, the volume of upper subchamber 35 will be reduced and the liquid therein will be forced to flow through the aperture 28 in the inertia track 27 downwardly into the lower subchamber 36. The flow of liquid into the lower subchamber will force the diaphram 29 to flex downwardly, increasing the volume of the lower subchamber to accept the increased volume of the liquid flowing into it. The lower surface of the housing 11 is provided with a series of vent holes 7 so the diaphragm 29 may flex freely to accommodate the flow of liquid.

The construction of the mount thus far described, providing a combination of solid elastomer and fluid dampening, is generally known in the art and has long been used in automotive applications. However, the application of conventional automotive design criteria to mounts for use in marine applications resulted in totally unacceptable performance. In a typical automotive application, the maximum force imposed on a fluid mount, resulting from high impact or shock loads, generally does not exceed 5 to 6 g's. Automotive fluid mounts are designed to operate over the full range of anticipated loads and, thus, the fluid chamber and particularly the inertia track are designed to operate and provide fluid flow over the full range of forces encountered in operation. On the other hand, the maximum forces imposed on a marine engine mounting system as a result of high impact shock loads often reach 20 g's and have been measured as high as 40 g's. A fluid mount utilizing the general features of construction hereinabove described cannot be made which will handle both the high shock loads encountered in marine use and also dampen the vibrations and low level shock loads encountered in normal operation. In the fluid mount of the present invention the aperture 28 in the inertia track 27 is made of a substantially restricted size to prevent the flow of liquid therethrough under high shock load conditions. With the flow of the liquid from the upper subchamber 35 to the lower 36 restricted, deflection of the elastomer element is similarly restricted. Under such conditions, with the flow of the liquid through the aperture prevented, the entire fluid mount will "lock-up" and act as an essentially solid mount. Thus, high shock loads, such as those produced by the boat dropping from the crest into the trough of a large wave, will be transmitted directly to the hull and prevent overload damage to or failure of the fluid mounts.

The parameters influencing liquid flow through the aperture 28 as a result of deflection of the elastomer member 13 include the area and length of the aperture and the viscosity of the liquid. The diameter and thus the area of the aperture 28 have been found to be the most readily adjustable parameter to provide a fluid mount giving the best vibration isolation and cushioning against light shock loading, and yet lock up and react as a rigid mount under high shock load conditions. For example, applying the criteria used in the design of fluid mounts for automotive applications, the recommended diameter for the aperture 28 in the inertia track 27 was ⅜ inch. A mount so constructed resulted in unacceptable performance, in terms of both passenger comfort under normal operating conditions and the transmission to the hull of high loads under heavy impact conditions. A fluid mount having an inertia track aperture of 5/32 inch provided the necessary mount lock up under high impact loads (generally in excess of about 6 g's), yet resulted in vibration isolation and general ride comfort superior to prior art mounting systems utilizing either solid elastomer mounts or automotive fluid mounts. The area of the aperture providing the best overall rids for marine applications is more than 5 times smaller than the area of the aperture designed with the use of conventional automotive standards. The marine fluid mount has substantially greater stiffness than the comparable automotive mount, however, the ride is substantially improved, further suggesting that the nature and manner of transmission of vibratory forces and shock loads in a marine application are significantly different than an automotive application.

Another means for restricting flow through the aperture 28 in the inertia track 27 is to increase the length of the aperture. Obviously, to increase the length, the thickness of the inertia track would have to be increased. This, in turn, may require an increase in the overall length of the mount which is generally less acceptable because of the desire to minimize the overall height of the engine and mounting system.

Figure 4:
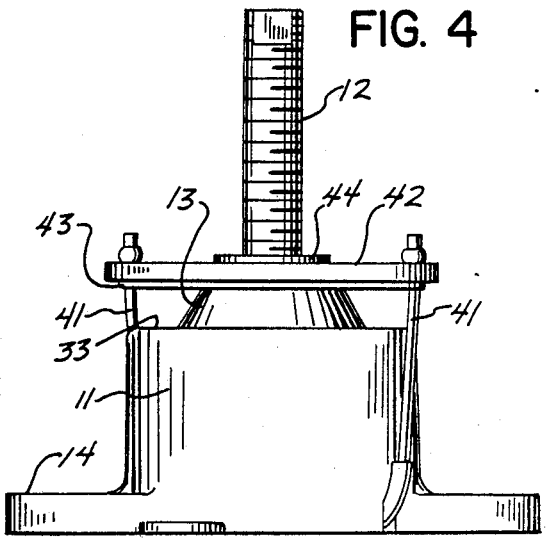
FIG. 4 is a side elevation of a fluid mount showing an alternate embodiment of the containment device.

Referring particularly to FIGS. 1 and 2, the fluid mount 10 is preferably provided with a containment strap 38. The strap is wrapped vertically around the housing 11 and has its ends secured to the opposite sides of a ring 40 surrounding the mounting stud 12. The containment strap 38 is intended to hold the fluid mount components together in the event of failure. In addition, the strap will also limit vertical displacement in opposite directions between the housing 11 and the mounting stud 12, as well as the total amount of tensile load which can be imposed on the mount. The elastomer member 13 is designed primarily to operate in a compressive mode and, therefore, the total amount of tensile force which it is able to withstand is substantially less. In FIG. 4, there is shown an alternate type of containment device which is intended for use with larger inboard engines or in applications where extremely high shock loads are encountered or anticipated. In this embodiment, a containment cable 41 is wrapped vertically around the housing 11 in a manner similar to the containment strap 38 shown in FIGS. 1 and 2. The ends of the containment cable 41 are attached to the periphery of a mounting ring 42 which surrounds the mounting stud 12 and the top of the elastomer member 13. The containment cable and mounting ring assembly functions to limit the vertical displacement in opposite directions between the stud 12 and the housing 11 and thereby limit the tensile load imposed on the mount in operation. In addition, however, the mounting ring 42 is also secured against vertical upward displacement with respect to the elastomer member 13 as the elastomer deflects vertically downward under load. The mounting ring 42 is secured to the top of the elastomer member 13 with a locking ring 44 or similar device surrounding the stud 12 and overlying the top of the ring 42. An annular elastomer bumper 43 is bonded to the underside of the mounting ring 42 and is adapted to engage the upper edge 33 of the housing 11 to provide a cushioned limit to the maximum compressive displacement of the mount.

The housing 11 including the lower connecting member 17, as well as the upper connecting member 16 and inertia track 27, are preferably made of cast aluminum. Conventional automotive mounts use cast iron components which are not well suited to the marine application described herein. Aluminum is more ductile and will better withstand the high shock loads. In addition, aluminum will withstand corrosion much better than iron.

Figure 5:
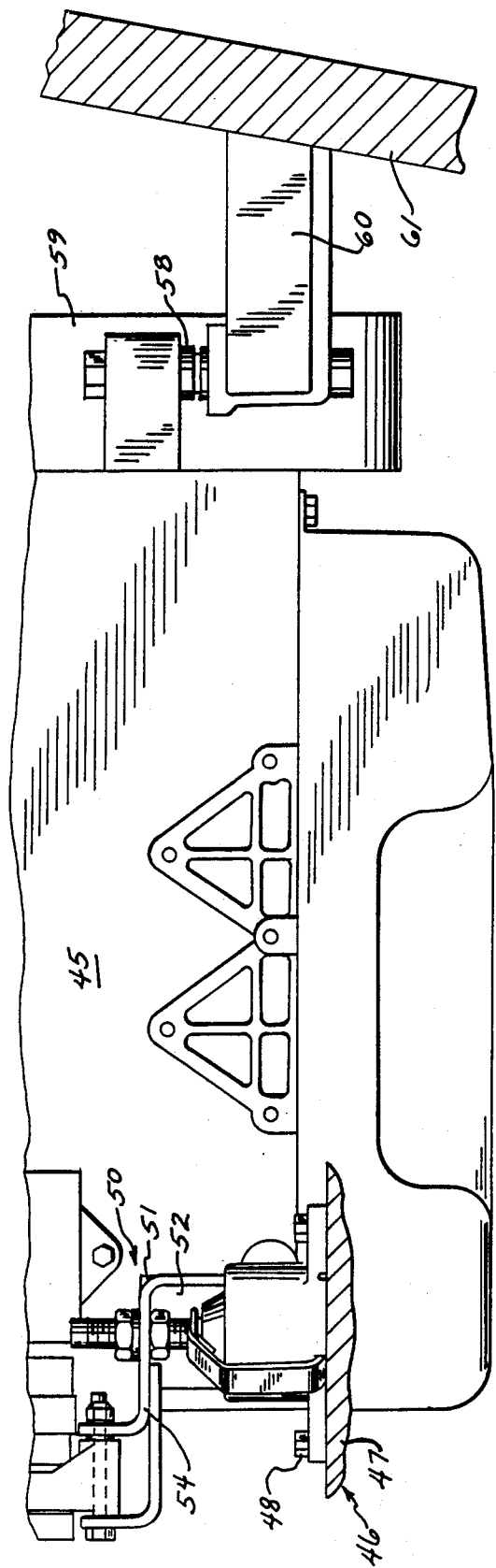
FIG. 5 is a side elevation of marine engine mounted in a boat utilizing the mounting system of the present invention.
Figure 6:
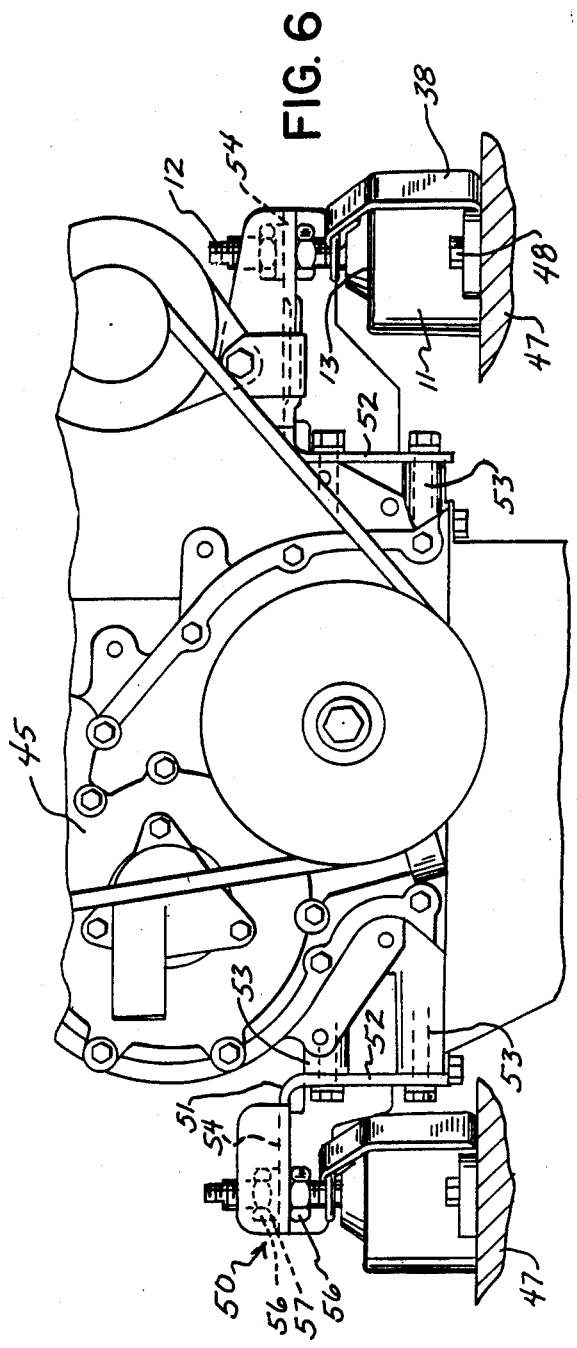
FIG. 6 is a front elevation view of the engine and mounting system shown in FIG. 5.

FIGS. 5 and 6 show the arrangement for utilizing the fluid mounts of the present invention to mount an inboard marine engine to a boat. A pair of fluid mounts 10 interconnects an engine 45 and a support structure 46 on the hull of a boat (not shown). The support structure may conveniently comprise a pair of laterally spaced stringers 47 located on the centerline and generally running the length of the hull. The fluid mounts are disposed at the forward end of the engine 45 and spaced in lateral alignment near the outer edges of the engine. The housing 11 of each mount is positioned atop a stringer 47 and secured thereto with bolted connections 48 through the mounting flanges 14. A mounting assembly 50 interconnects the mounting stud 12 and the block of the engine 45. The mounting assembly 50 includes a generally L-shaped mounting bracket 51 attached by its vertical leg 52 to connector bosses comprising integral parts of the cast engine block. The mounting bracket 51 is attached such that its horizontal leg 54 extends laterally outwardly and includes a mounting hole 55 for receipt therethrough of the threaded mounting stud 12. The stud is secured to the horizontal leg 54 of the mounting bracket with nuts 56 and interposed washers 57.

It has been found that the positioning of the fluid mounts both laterally and longitudinally with respect to the length of the engine is important to obtain optimum vibration isolation, as well as the dampening of light shock loads, encountered in normal operation. The fluid mounts 10 are preferably positioned just behind the front face of the engine block. This is substantially ahead of the approximately mid-engine location suggested by the application of conventional automotive fluid mount design and placement. The lateral spacing of the mounts 10 should place them as far apart as practicable. However, practical restrictions dictate that the mounts should remain generally within the lateral confines of the existing engine package and, in addition, should be located such that they correspond to the lateral spacing of the stringers 47 on which they are mounted. For example, a typical stringer spacing which would also establish the lateral spacing of the mounts is 22½ inches. Although the mounts in the present mounting system are located substantially forward of the mid-engine location suggested by automotive criteria, they are still slightly aft of the front of the engine. A conventional prior art 3 point mounting system utilizing a single solid elastomer mount just forward of and on the center line of the engine increases the total engine package length by about 5 inches. This increase in length is eliminated in the mounting system of the present invention.

The rear of the engine 45 may be supported with a pair of laterally disposed solid elastomer mounts 58 typical of the prior art. The solid elastomer rear mounts 58 are constructed of a hollow cylindrical elastomer member bonded between cylindrical inner and outer metal sleeves, as described in the above identified U.S. Pat. No. 3,259,099. The outer sleeve is typically attached to the engine, as by mounting the same to the flywheel housing 59. A bolted connection through the inner sleeve is used to attach the rear mount to one end of a support arm 60, the other end of which is attached to the boat transom 61. The construction and mounting of the solid elastomer rear mounts 58 is conventional and well known in the art, however, their use in combination with the fluid mounts 10 of the present invention in the mounting system described results in truly optimized performance and riding comfort.

Various modes of carrying out the invention are contemplated as being within the scope of the following claims particularly pointing out and distinctly claiming the subject matter which is regarded as the invention.

I claim:

1. A fluid mount for mounting an inboard marine engine to a boat comprising:
   a housing having an upwardly opening side wall and an enclosing bottom wall;
   rigid upper connector means for attaching the mount to the engine;
   rigid lower connector means for attaching a solid elastomer element to said housing;
   a solid elastomer element disposed between and bonded to said upper and lower connector means;
   fluid dampening means disposed within said housing between the elastomer element and the bottom wall of said housing;
   said elastomer element and fluid dampening means adapted to operate concurrently to dampen the transmission of vibration and low shock loads from the engine to the boat, said fluid dampening means comprising a damping chamber filled with a liquid, a flexible diaphragm adjacent said housing bottom wall and forming one wall of said chamber, an inertia track within the chamber between the elastomer element and said diaphragm, said inertia track having an aperture permitting flow of the liquid therethrough in response to movement of said elastomer element under load, said aperture having a size such that the flow of liquid therethrough is essentially prevented under high shock loads.

2. The fluid mount as set forth in claim 1 wherein the connector means and the housing are made of aluminum.

3. The fluid mount as set forth in claim 1 including containment means interconnecting the housing and the upper connector means to limit axial movement therebetween under a tensile load on the mount.

4. The fluid mount as set forth in claim 3 wherein said containment means comprises a flexible strap surrounding the housing and attached by its ends to the upper connector means.

5. The fluid mount as set forth in claim 4 wherein said flexible strap comprises a cable.

6. The fluid mount as set forth in claim 5 wherein said upper connector means includes a rigidly attached mounting ring overlying the housing and spaced therefrom, said mounting ring having means for attaching the ends of the cable thereto.

7. The fluid mount as set forth in claim 6 wherein said mounting ring is adapted to engage the housing under a high compressive load to limit the relative movement of the upper connector means toward said housing.

8. The fluid mount as set forth in claim 1 wherein said inertia track comprises a rigid annular disc.

9. A system for mounting an inboard marine engine to the hull of a boat comprising:
   a pair of resilient forward engine mounts interconnecting the engine and engine support structure on the hull, said forward engine mounts disposed in lateral alignment on opposite sides of the engine;
   each of said forward mounts including rigid upper and lower connector means for effecting the interconnection between the engine and the support structure, a solid elastomer member disposed between and bonded to said connector means, and fluid dampening means disposed between said elastomer and one of said connector means, a housing attached to said one connector means and providing an enclosure for said fluid dampening means; and
   said fluid dampening means adapted to operate with said elastomer member to dampen vibrations and low shock loads transmitted from the engine to the hull under normal operating conditions;
   wherein said fluid dampening means comprising a damping chamber filled with a liquid, a flexible diaphragm adjacent said housing bottom wall and forming one wall of said chamber, an inertia track within the chamber between the elastomer element and said diaphragm, said inertia track having an aperture permitting flow of the liquid therethrough in response to movement of said elastomer element under load, said aperture having a size such that the flow of liquid therethrough is essentially prevented under high shock loads.

10. The mounting system as set forth in claim 9 including resilient rear engine mounting means interconnecting the engine and the boat.

11. The mounting system as set forth in claim 10 where the rear engine mounting means comprises a pair of elastomer mounts disposed in lateral alignment on opposite sides at the rear of the engine.

12. The mounting system as set forth in claim 9 wherein said forward mounts are disposed immediately aft of the forward face of the engine.

13. The mounting system as set forth in claim 9 wherein said housing is attached to the engine support structure.

14. The mounting system as set forth in claim 13 wherein the other connector means includes a vertically disposed mounting stud for connection to the engine.

15. A fluid mount for mounting an inboard marine engine to the hull of a boat comprising:
a generally cup-shaped housing defining an open cylindrical interior;
an annular elastomer member including rigid inner and outer connecting members bonded thereto;
the outer connecting member having a cylindrical outer surface adapted to be pressed tightly into the interior of the housing and to define therewith an interior fluid chamber;
an annular flexible diaphragm disposed in the fluid chamber and spaced from the bottom of the housing to define with the elastomer member a liquid-filled damping chamber;
a rigid annular disc disposed in the damping chamber and dividing the damping chamber into upper and lower subchambers, said disc having an aperture therein permitting flow of the liquid between said sub-chambers; and,
said aperture being of restricted size whereby flow of liquid through the aperture is prevented under high shock loads imposed on the boat.

16. The fluid mount as set forth in claim 15 including a mounting member to each of the housing and the inner connecting member for attaching the mount between the engine and the boat.

17. The fluid mount as set forth in claim 16 wherein one of said mounting members comprises a mounting stud rigidly attached to the inner connecting member.

18. The fluid mount as set forth in claim 17 wherein the other of said mounting members comprises a mounting flange integral with the housing.

* * * * *